US007929599B2

(12) United States Patent
Ganesh et al.

(10) Patent No.: US 7,929,599 B2
(45) Date of Patent: Apr. 19, 2011

(54) ACCELERATED VIDEO ENCODING

(75) Inventors: Anand Ganesh, Redmond, WA (US);
Donald J Munsil, Kirkland, WA (US);
Gary J. Sullivan, Redmond, WA (US);
Glenn F. Evans, Kirkland, WA (US);
Shyam Sadhwani, Bellevue, WA (US);
Stephen J. Estrop, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 1409 days.

(21) Appl. No.: 11/276,336

(22) Filed: Feb. 24, 2006

(65) Prior Publication Data
US 2007/0204318 A1 Aug. 30, 2007

(51) Int. Cl.
H04B 1/66 (2006.01)
(52) U.S. Cl. .................. 375/240; 375/E7.026; 386/283; 386/331; 386/346; 725/20
(58) Field of Classification Search .......................... None
See application file for complete search history.

(56) References Cited

U.S. PATENT DOCUMENTS

| 6,044,408 | A | 3/2000 | Engstrom et al. |
| 6,128,026 | A | 10/2000 | Brothers, III |
| 6,721,359 | B1 | 4/2004 | Bist et al. |
| 6,748,019 | B1 | 6/2004 | Lin et al. |
| 2002/0065952 | A1 | 5/2002 | Sullivan et al. |
| 2003/0052909 | A1 | 3/2003 | Mo et al. |
| 2003/0156643 | A1 | 8/2003 | Song |
| 2004/0228405 | A1 | 11/2004 | Yu et al. |
| 2005/0024363 | A1 | 2/2005 | Estrop |
| 2005/0025241 | A1 | 2/2005 | Sullivan et al. |
| 2005/0063461 | A1 | 3/2005 | Lee et al. |
| 2005/0078119 | A1 | 4/2005 | Chiaruzzi et al. |
| 2005/0094730 | A1* | 5/2005 | Chang et al. ............. 375/240.17 |

OTHER PUBLICATIONS

"CinePlayer DVD Decoder Pack for Windows XP; Summary", http://www.sonic.com/products/Consumer/CinePlayer/Technology/acceleration.aspx. 14 pages.
http://www.hisdigital.com/html/9000series_brochure.pdf.
http://msdn.microsoft.com/library/default.asp?url=/library/en-us/graphics/hh/graphics/dxvaguide_d531ae3a-1132-44e9-9931-d0bdd76e676f.xm.asp.
http://www.nforcershq.com/article-print-891.html.
"OC Workbench", http://www.ocworkbench.com/hardware/Leadtek/winfast%20gts/winfast2.htm, 2 pages.

(Continued)

Primary Examiner — David C. Payne
Assistant Examiner — Adolf Dsouza
(74) Attorney, Agent, or Firm — Lee & Hayes, PLLC

(57) ABSTRACT

A video encoding acceleration service to increase one or more of the speed and quality of video encoding is described. The service acts as an intermediary between an arbitrary video encoder computer program application and arbitrary video acceleration hardware. The service receives one or more queries from the video encoder to identify implementation specifics of the video acceleration hardware. The service interfaces with the video acceleration hardware to obtain the implementation specifics. The service communicates the implementation specifics to the video encoder. The implementation specifics enable the video encoder to: (a) determine whether one or more of speed and quality of software encoding operations associated with the video encoder can be increased with implementation of a pipeline of one or more supported encoding pipeline configurations and capabilities, and (b) implement the pipeline by interfacing with the service.

17 Claims, 7 Drawing Sheets

OTHER PUBLICATIONS

"Sage TV; Why does SageTV "look" better than it's competition? (picture quality)", http://htpcnew.com/main/php?id=interview1, 3 pages.

"Why MetaVR Uses Microsoft DirectX", http://www.metavr.com/technology/directx.html, 3 pages.

"Windows Media; Enabling DirectX Video Acceleration", http://msdn.microsoft.com/library/default.asp?url=/library/en-us/wmform95/htm/enablingdirectxvideoacceleration,asp, 3 pages.

"CinePlayer DVD Decoder Pack for Windows XP; Summary", http://www.sonic.com/products/Consumer/CinePlayer/Technology/acceleration.aspx, Downloaded Feb. 23, 2006, 14 pages.

Excerpt—"Excalibur RADEON," http://www.hisdigital.com/html/9000series_brochure.pdf, Downloaded at least as early as Jun. 15, 2005, 1 page.

Excerpt—"MSDN, Introduction to Direct X VA," http://msdn.microsoft.com/library/default.asp?url=/library/en-us/graphics/hh/graphics/dxvaguide_d531ae3a-1132-44e9-9931-d0bdd76e676f.xm.asp, Downloaded at least as early as Jun. 15, 2005, 1 page.

Excerpt—"nForcersHQ," http://www.nforcershq.com/article-print-891.html, Downloaded at least as early as Jun. 15, 2005, 1 page.

"OC Workbench", http://www.ocworkbench.com/hardware/Leadtek/winfast%20gts/winfast2.htm, Downloaded Feb. 23, 2006, 2 pages.

"Sage TV; Why does SageTV "look" better than it's competition? (picture quality)", http://htpcnew.com/main/php? id=interview1, Downloaded Feb. 23, 2006, 3 pages.

"Why MetaVR Uses Microsoft DirectX", http://www.metavr.com/technology/directx.html, Downloaded Feb. 23, 2006, 3 pages.

"Windows Media; Enabling DirectX Video Acceleration", http://msdn.microsoft.com/library/default.asp?url=/library/en-us/wmform95/htm/enablingdirectxvideoacceleration.asp, Downloaded Feb. 23, 2006, 3 pages.

* cited by examiner

Motion Estimation
Parameters

ACCELERATED VIDEO ENCODING

BACKGROUND

Multimedia content production and distribution operations typically include video encoding. Video encoding processes are typically very data and computationally intensive. As a result, video encoding processes can be very time consuming. For example, it may take several tens-of hours for a software encoder to encode a high-quality high definition movie. Since quality and speed of video encoding processes are significant factors for successful multimedia content production and distribution pipelines, systems and techniques to increase the speed at which high quality video content can be encoded would be useful.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, a video encoding acceleration service to increase one or more of the speed and quality of video encoding is described. The service acts as an intermediary between an arbitrary video encoder computer program application and arbitrary video acceleration hardware. The service receives one or more queries from the video encoder to identify implementation specifics of the video acceleration hardware. The service interfaces with the video acceleration hardware to obtain the implementation specifics. The service communicates the implementation specifics to the video encoder. The implementation specifics enable the video encoder to: (a) determine whether one or more of speed and quality of software encoding operations associated with the video encoder can be increased with implementation of a pipeline of one or more supported encoding pipeline configurations and capabilities, and (b) implement the pipeline by interfacing with the service.

BRIEF DESCRIPTION OF THE DRAWINGS

In the Figures, the left-most digit of a component reference number identifies the particular Figure in which the component first appears.

DETAILED DESCRIPTION

Overview

Figure 1:
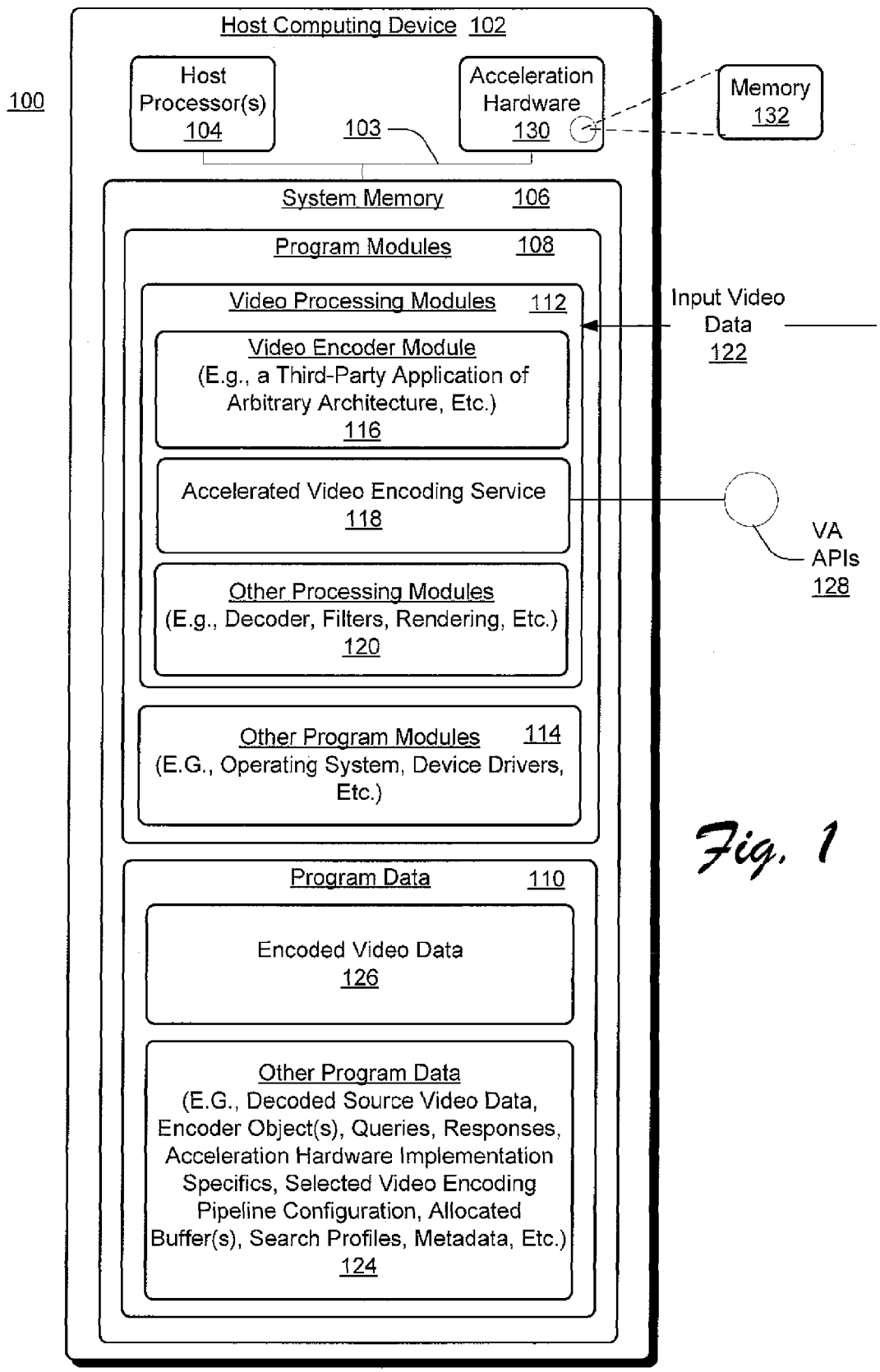
FIG. 1 illustrates an exemplary system for accelerated video encoding, according to one embodiment.

Systems and methods for accelerated video encoding provide a video encoding acceleration service. This service allows an arbitrary video encoder application to interface, in a device independent manner, with arbitrary video acceleration hardware to define and implement a substantially optimal video encoding pipeline. To accomplish this, the service exposes video acceleration (VA) application program interfaces (APIs). These APIs encapsulate a model of the video encoding process. To define an encoding pipeline, the video encoder application uses the VA APIs to query implementation specifics (e.g., capabilities, etc.) of available video (graphics) acceleration hardware. The video encoder evaluates these specifics in view of the application's particular video encoding architecture (software-implemented) to identify any encoding operations that could benefit (e.g., speed and/or quality benefits) from being accelerated in hardware. Such operations include, for example, motion estimation, transform, and quantization operations and inverse operations such as Motion compensation, inverse transforms and inverse quantization. The API also allows the video encoder to design an encoding pipeline that substantially minimizes dataflow transitions across buses and processors associated with the host computing device and the acceleration hardware, and thereby, further increase encoding speeds. The API also allows the acceleration hardware to influence the location of the data to improve local caching (e.g. the video acceleration hardware may functional more efficiently on memory local to the video hardware).

Based on these evaluations the video encoder designs a customized video encoding pipeline that performs some number of encoding operations in software and some number of encoding operations using the acceleration hardware (i.e., at least a subset of the operations that could benefit from being hardware accelerated). The encoder application then uses the API to create the pipeline and encode video content. This customized pipeline is substantially optimized as compared to a completely software-implemented pipeline because certain encoding operations are accelerated and data transitions between the host and the acceleration hardware are minimized. Additionally, processing time freed up by accelerating certain aspects of the encoding process and minimizing data transitions allow the host processor(s) to perform higher-quality encoding operations with freed-up processing cycles. The API is also designed to allow components to operate in parallel so that computational resource usage can be maximized.

These and other aspects of the systems and methods for accelerated video encoding are now described in greater detail.

An Exemplary System

Although not required, the systems and methods for accelerated video encoding are described in the general context of computer-executable instructions (program modules) being executed by a computing device such as a personal computer and graphics (video) encoding acceleration hardware. Program modules generally include routines, programs, objects, components, data structures, etc., that perform particular tasks or implement particular abstract data types.

FIG. 1 shows an exemplary system 100 for accelerated video encoding, according to one embodiment. System 100 includes host computing device 102. Host computing device 102 represents any type of computing device such as a personal computer, a laptop, a server, handheld or mobile computing device, etc. Host computing device 102 includes one or more processing units 104 coupled across a bus 103 to system memory 106. System memory 106 includes computer-program modules ("program modules") 108 and program data 110. A processor 104 fetches and executes computer-program instructions from respective ones of the program modules 108. Program modules 108 include video processing modules 112 for processing video content, and other program modules 114 such as an operating system, device drivers (e.g., for interfacing to video encoding acceleration hardware, etc.), and/or so on. Video processing modules 112 include, for example, video encoder 116, video encoding acceleration service 118, and other processing modules 120, for example, a video decoder, video filter(s), a video renderer, etc.

In this implementation, video encoder 116 is an arbitrary video encoder. This means that the particular architecture, operation, data formats, etc, implemented and/or utilized by video encoder 116 are arbitrary. For example, video encoder 116 may be distributed by a third party, an OEM, etc. Additionally, although FIG. 1 shows video encoding acceleration service 118 independent of the operating system portion of "other program modules" 114, in one implementation, video encoding acceleration service 118 is part of the operating system.

Video processing modules 112 receive compressed or uncompressed input video data 122. When input video data 122 is compressed (already encoded), video processing modules 112 decode the input video data 122 to produce decoded source video data. Such decoding operations are performs by a decoder module.

In another implementation, partially decoded data could also be retained to further assist the encoding process. For purposes of exemplary illustration, such a decoder module is shown as a respective portion of "other video processing modules" 120. Thus, decoded source video data is represented either by input video data 122 that was received in a decoded state, or represented with results of decoding input video data 122 that was received in an encoded state. Decoded source video data is shown as a respective portion of "other program data" 124.

To design and implement a customized video encoding pipeline that can be used to encode decoded source video data into encoded video data 126, video encoder 116 interfaces with video encoding acceleration service 118 via video acceleration (VA) APIs 128. To define an encoding pipeline, the video encoder application uses respective ones of the VA API 128 (e.g., IVideoEncoderService) to obtain implementation specifics of available acceleration hardware 130. Such implementation specifics include, for example:

- an enumerated array identifying supported video encoding pipeline configurations of the acceleration hardware 130 (e.g., obtained via a GetCapabilities interface);
- an indication of supported video formats (e.g., MPEG, WMV, etc.; GetSupportedFormats);
- supported search metrics for motion estimation (ME) operations (GetDistanceMetrics);
- supported search profiles for processing time vs. quality tradeoff decisions (GetSearchProfiles); and/or
- supported ME capabilities, for example, image size information, maximum search window size, variable macroblock support indication, etc. (GetMECapabilities).

Responsive to receiving such requests from the video encoder 116, video encoding acceleration service 118 queries the video acceleration hardware 130 for the requested implementation specifics and returns information associated with the corresponding responses from the acceleration hardware 130 to the video encoder 116. Video encoding acceleration service 118 interfaces with the video acceleration hardware 130 using a corresponding device driver. Such a device driver is shown as respective portion of "other program modules" 114.

Video encoder 116 evaluates the implementation specifics supported by acceleration hardware 130 in view of the application's particular video encoding architecture (software-implemented) to identify any encoding operations that could benefit (e.g., speed and/or quality benefits) from being accelerated in hardware, select a search profile to encapsulate a trade-off between video encoding quality and speed, minimize data transitions across buses and between processors, etc. Exemplary operations that may benefit from hardware acceleration include, for example, motion estimation, transform, and quantization. For example, one reason to perform quantization in hardware is to minimize dataflow between pipeline stages.

Figure 2:
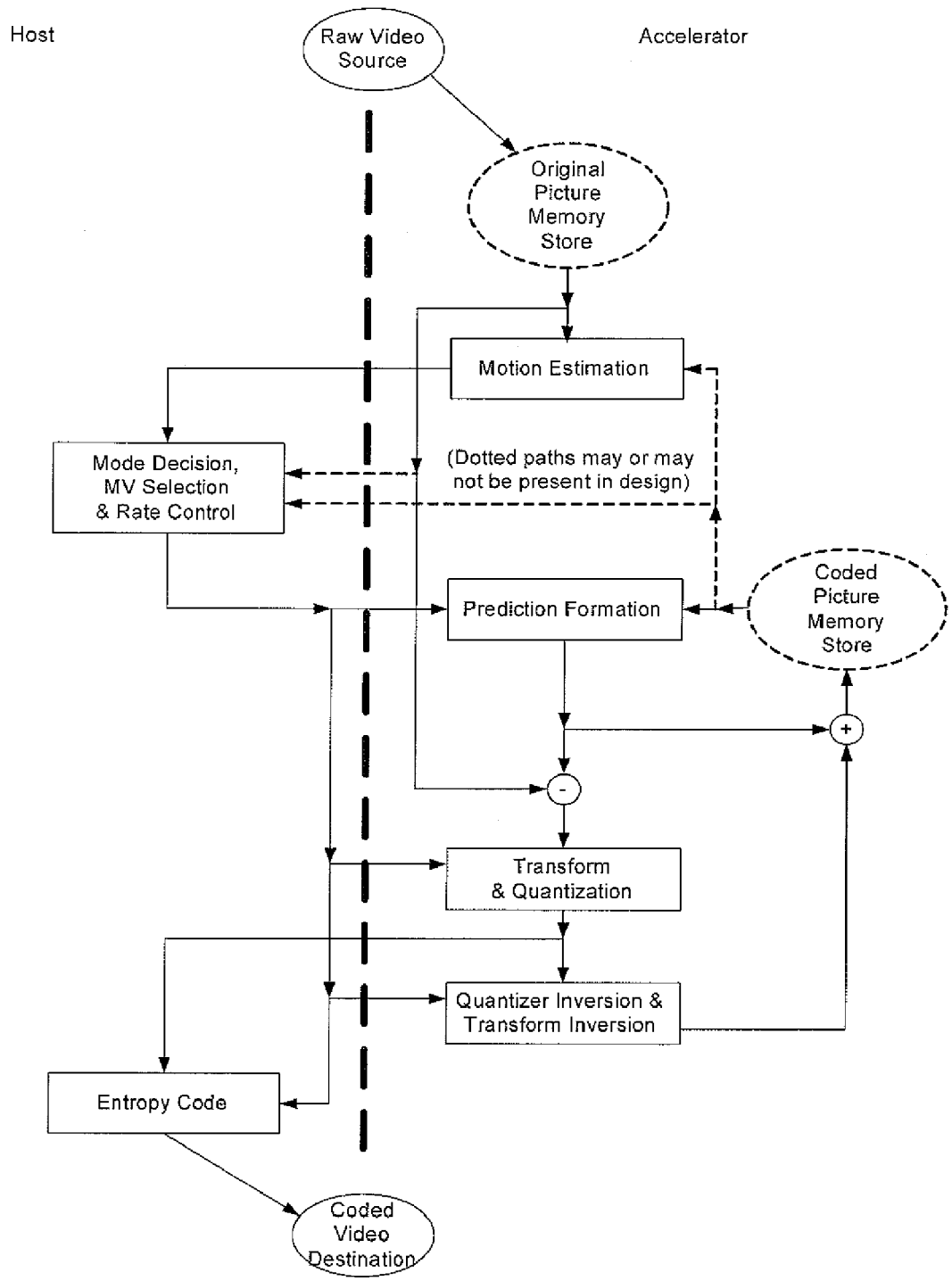
FIG. 2 shows an exemplary embodiment of a video encoding pipeline configuration, wherein some of the encoding processes are accelerated in hardware.

FIG. 2 shows an exemplary embodiment of a video encoding pipeline configuration, wherein some of the encoding processes are accelerated in hardware. For purposes of illustration, processing-operations illustrated on the right side of the figure are accelerated by hardware (e.g., acceleration hardware 130 of FIG. 1) and of those illustrated on the left side of the figure are performed by the host computing device 102 (FIG. 1). Significantly, the described pipeline configuration customization model allows video encoder 116 to customize the encoding pipeline to indicate that respective ones of the host implemented processing operations are to be accelerated in hardware, and vice versa. Additionally, optional data access pathways are shown in FIG. 2 with dotted lines. Note that the pipeline configuration shown in FIG. 2 does not copy input source video ("raw video source") to the host computing device 102 if the source is not originating from the host and if the host decision making engine (video encoder 116) does not use the source video. For example, if quantization decisions do not require the host to touch the video data, the data will not be transferred.

Referring to the exemplary video encoding pipeline of FIG. 2, and in this particular implementation, video encoder 116 (FIG. 1) takes as input some form of compressed or uncompressed video data (input video data 122). The video encoder is configured to convert the input data to another compressed form. For example, such operations may include converting uncompressed (YUV) video data to compressed MPEG-2, or it may include transcoding video data from MPEG-2 data format to WMV data format. For purposes of exemplary illustration, assume that the transcoding operations include a full or partial decompression stage followed by an encode stage (there are more efficient models which by-pass decompression and work purely in the transform (DCT) space).

A number of video compression formats make use of motion estimation, transform and quantization to achieve compression. Of the compression stages, motion estimation is typically the slowest step, including a massive search operation where an encoder (e.g., video encoder 116) attempts to find the closest matching reference macroblock for macroblocks in a given image. Once the optimal motion vectors are determined for each of the macroblocks, the encoder computes the differential residues based on the previously coded image and the optimal motion vector. The motion vector, along with the differential residue is a compact representation of the current image. The motion vector data is further represented differentially. The host encoder can optionally request the re-evaluation of motion vectors by the video acceleration hardware to find a macroblock with a smaller combined motion vector and/or residual. The resulting differential motion vector data, and the residual data are compacted, for example, using techniques like run-length encoding (RLE) and differential coding (e.g.: Huffman and Arithmetic coding) to generate the final coded stream of bits (encoded video data 126).

Referring again to FIG. 1, in one implementation, video encoder 116 is a multi-threaded application providing for full utilization of acceleration hardware 130. In this implementation, when determining which video encoding operations are to be accelerated in hardware, video encoder 116 may structure the particular pipeline configuration such that both processor 104 and acceleration hardware 130 is fully utilized. For example, when video encoding pipeline motion estimation operations are being performed by hardware for a particular frame of video data, the pipeline may be configured to perform entropy (or arithmetic or Huffman) coding operations in software by the host on a different frame of video data. An exemplary single motion vector pipeline can be implemented representing the particular pipeline configuration selected/structured. Exemplary multiple motion vector (relatively complex) pipelines can be implemented wherein video encoder 116 requests multiple motion vectors from acceleration hardware 130 and selects one motion vector pipeline based on various parameters.

With respect to selecting a search profile, the quality of motion vectors refers to a bitrate of a stream generated by the use of the motion vectors. High quality motion vectors are associated with low bitrate streams. The quality is determined by the completeness of the block search, the quality of the algorithm, the distance metric used, etc. High quality motion vectors should be used to perform high quality video encode operations. To address this, video encoding acceleration service 118 provides a generic construct called a search profile to encapsulate a trade-off between quality and time. The search profile also includes meta-data to identify the search algorithm used by the acceleration hardware 130, etc. Video encoder 116 chooses a particular search profile based on the particular requirements of the encoder's implementation.

With respect to minimizing data transitions across buses and between processors, an encode process implemented by a video encoding pipeline configuration will typically include several processing stages, each of which may or may not be accelerated via acceleration hardware 130. In cases where video encoder 116 determines to utilize hardware acceleration in successive stages of the encode pipeline, it may not be necessary to move data from acceleration hardware 130 based memory 132 to the system memory 106 associated with the host computing device 102, and then back to acceleration hardware based memory 132 for the next stage, and so on.

More particularly, while pointers to various types of video and motion vector data may be transferred back and forth between the host computing device 102 and the acceleration hardware 130, actual data is copied to system memory 106 only when the data pointer (a D3D9 Surface pointer) is explicitly locked using IDirect3DSurface9::LockRect.

Exemplary interfaces for locking a surface are known (e.g., the well-known IDirect3DSurface9::LockRect.interface). Thus, in cases where two encoding pipeline stages follow one another, and host computing device 102 does not need to do perform any intermediate processing, host computing device 102 can decide not to "Lock" the allocated buffer between the processing stages. This will prevent a redundant memory copy of data, and thereby, avoid unnecessary data movement/transfers. In this manner, video encoder 116 is able to design a video encoding pipeline that substantially minimizes data transfers across buses and between processors, and thereby, further increase video encoding speeds.

At this point, video encoder 116 has evaluated the implementation specifics supported by acceleration hardware 130 in view of the application's particular video encoding architecture (software-implemented) to identify any encoding operations that could benefit from being accelerated in hardware, selected a search profile, minimized data transitions across buses and between processors, and/or so on. Based on these determinations, video encoder 116 selects a particular pipeline configuration to encode decoded source video data, and thereby, generate encoded video data 126. Next, video encoder 116 interfaces with video encoding acceleration service 118 to create an encoder object to implement the selected pipeline (CreateVideoEncoder API). In this implementation, an encoder object (e.g., a regular COM object) is created by identifying the selected pipeline configuration and one or more of the following: a format for the output encoded bitstream, the number of input and output data streams associated with the pipeline configuration, static configuration properties, a suggested number of buffers (surfaces) for association with the different I/O streams based on the selected pipeline configuration, and a driver specified allocator queue size based on resources a graphics device driver is able to gather, and other parameters. (Queue size and the number of data buffers are essentially referring to the same thing; one is "suggested", the other is "actual").

Next, video encoder 116 uses the created encoder object to interface with the video encoding acceleration service 118 to encode the decoded source video data. To this end, the encoder object submits execute requests to acceleration hardware 130 (IVideoEncode:Execute API).

In view of the above, system 100 allows arbitrary implementations of video encoder applications 116 to define and create video encoding pipeline configurations during runtime to take full advantage of available video encoding acceleration hardware to increase encoding speed and quality. As part of these runtime configuration operations, the video encoder 116 can use VA APIs 128 to specify that the encoding pipeline is to implement iterative directed searching (multiple search passes of increasing refinement), define and use generically selectable search strategies (e.g., selecting a search algorithm based on quality metrics independent of any knowledge of details about the actual algorithm been employed), utilize format independent methodologies (e.g., where a video encoder 116 is unaware of the particular image format of input video data 122 and the acceleration hardware 130 is unaware of the compressed output format for the encoded video data 126) to control searching, adapt data sizes (e.g., where the video encoder 116 selects a macro block size based on a search algorithm), and so on.

An Exemplary Procedure

Figure 3:
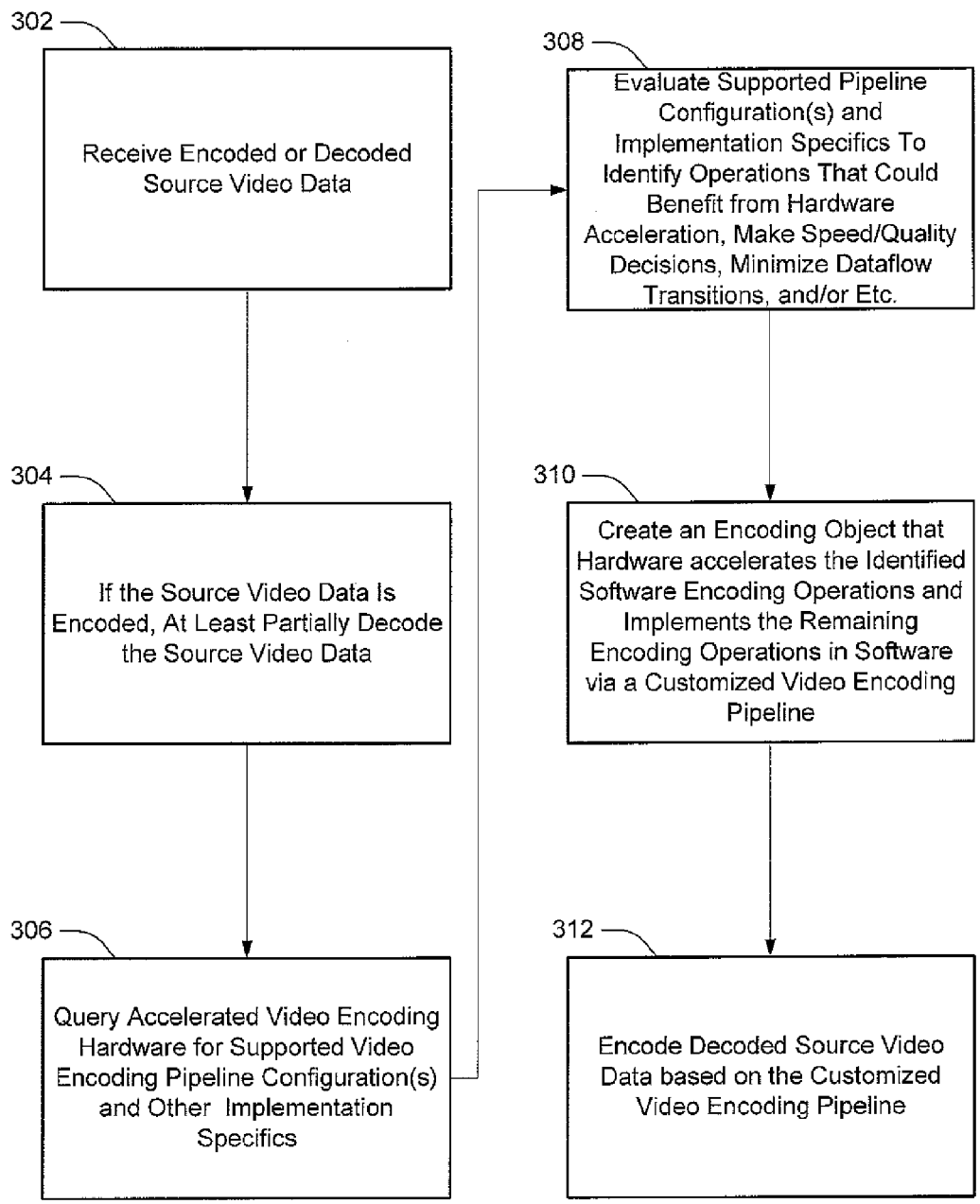
FIG. 3 shows an exemplary procedure for accelerated video encoding, according to one embodiment.
Figure 4:
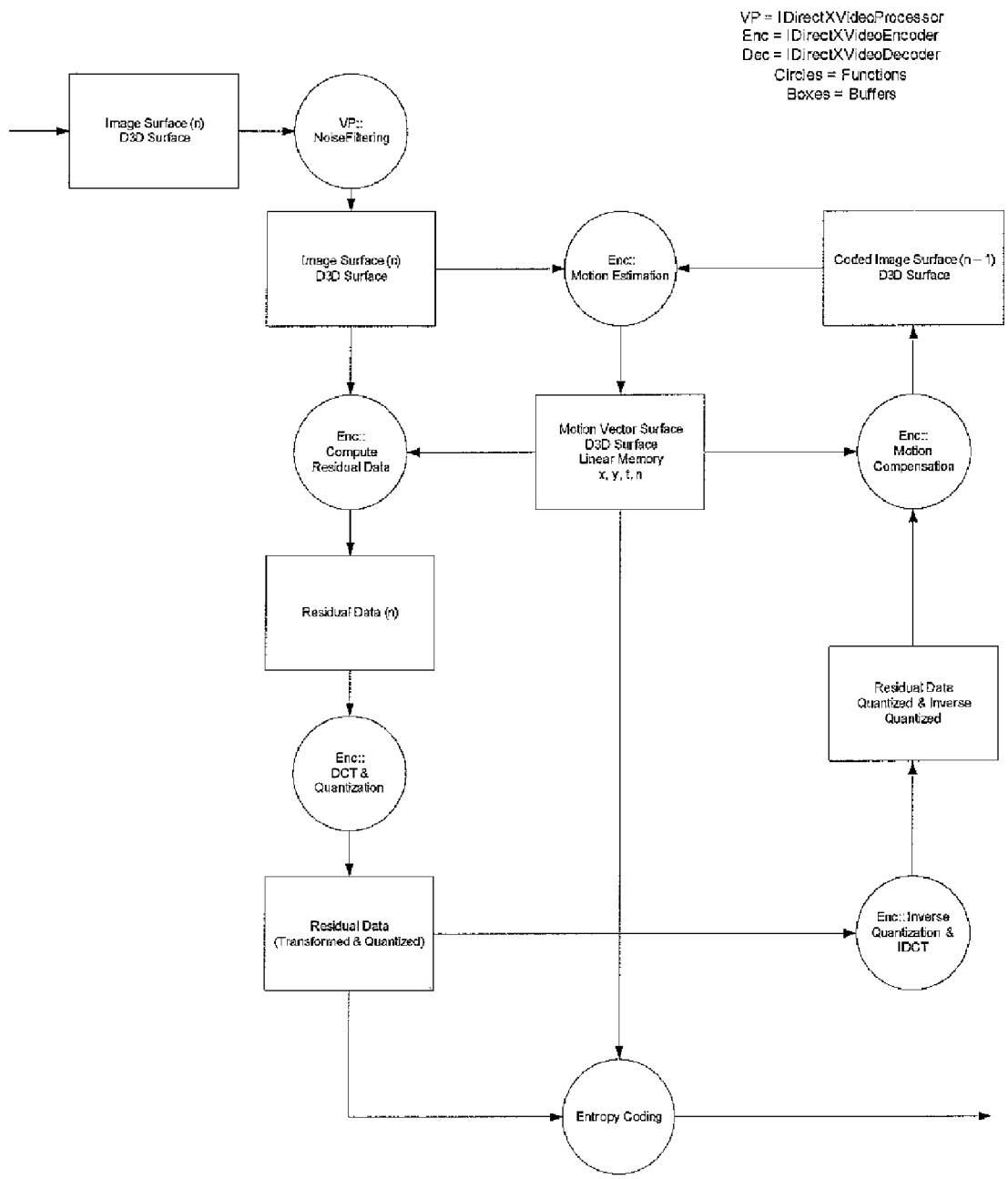
FIG. 4 shows an exemplary video encoder application to illustrate the manner in which video encoding acceleration application programming interfaces can be utilized, according to one embodiment.
Figure 5:
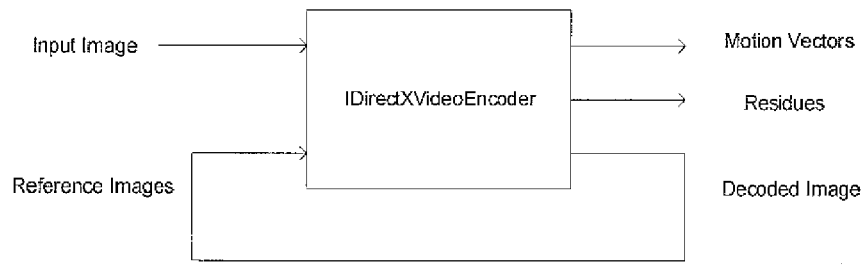
FIG. 5 shows an exemplary video encoding pipeline configuration, wherein acceleration hardware accelerates motion estimation, transform, quantization, and the inverse process to produce encoded images, according to one embodiment.
Figure 6:
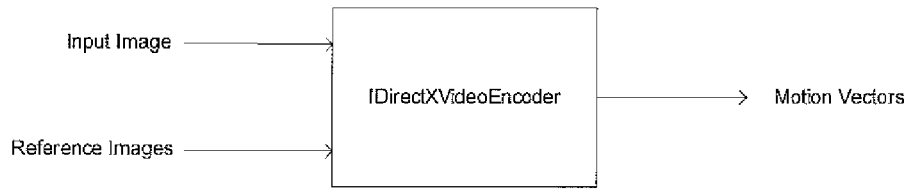
FIG. 6 shows an exemplary video encoding pipeline configuration in which hardware accelerates only motion estimation, according to one embodiment.
Figure 7:
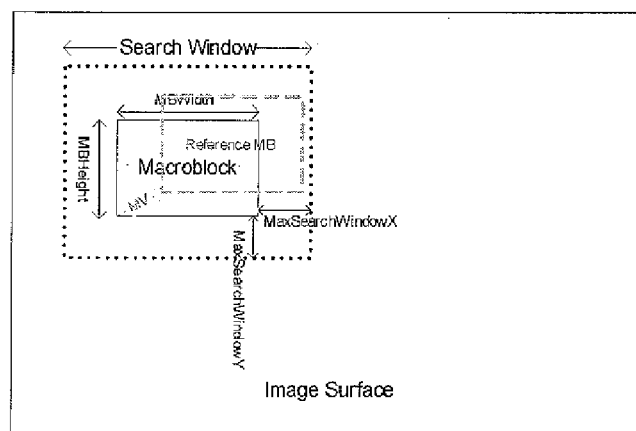
FIG. 7 shows several exemplary motion estimation parameters, according to one embodiment.
Figure 8:
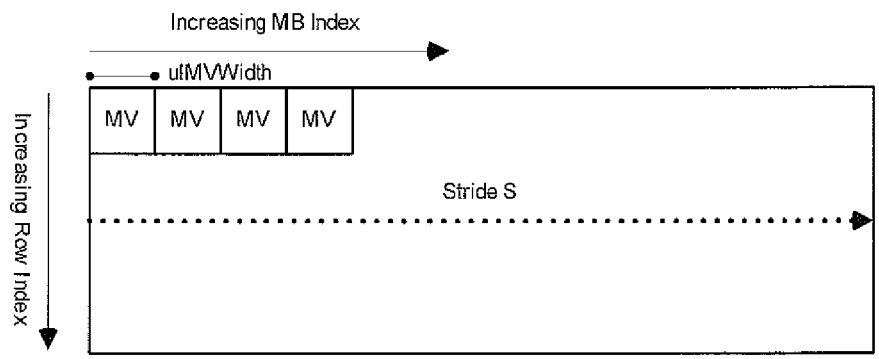
FIG. 8 shows exemplary motion vector data stored in a Display 3-Dimensional (D3D) surface, according to one embodiment.
Figure 9:
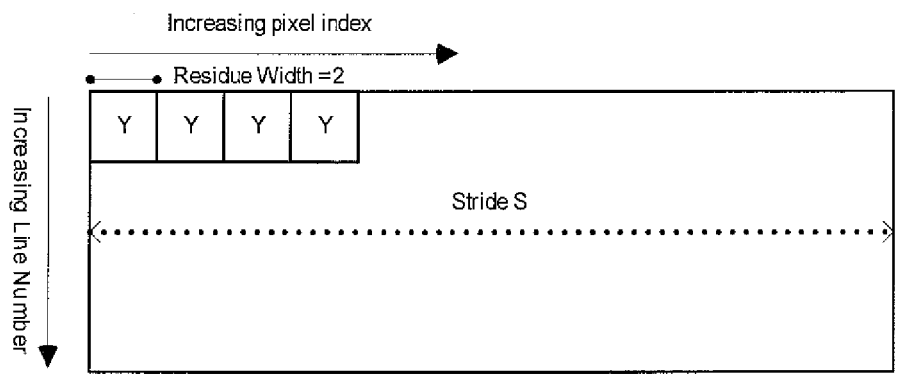
FIG. 9 shows an exemplary diagram indicating that width of a luma surface matches an original YCbCr image.
Figure 10:
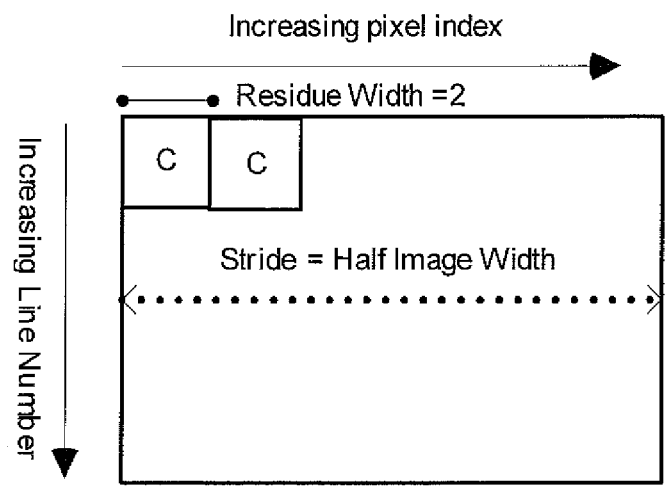
FIG. 10 shows an exemplary diagram indicating that the number of residue value per line of video is half with width of the original video image.
Figure 11:
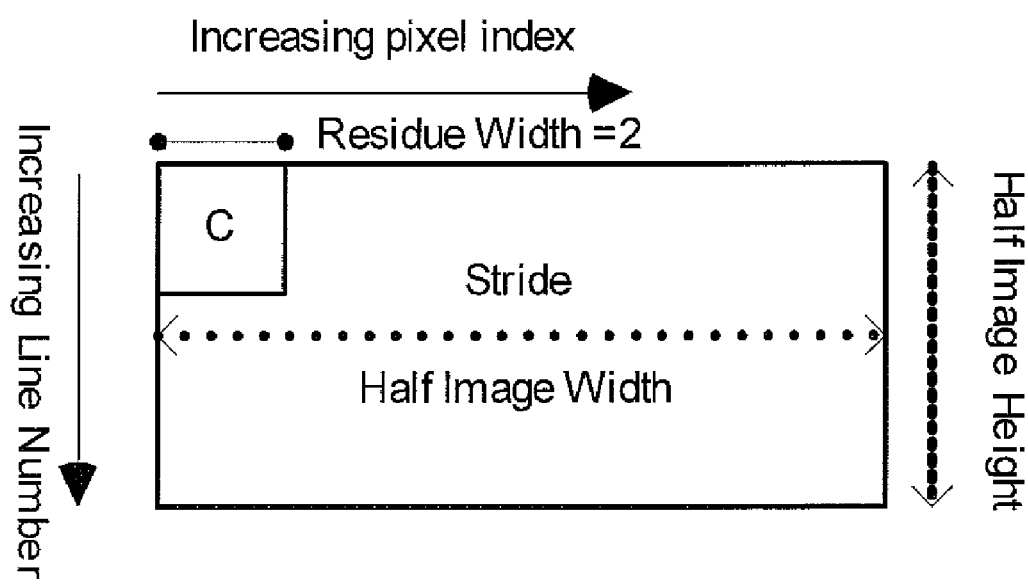
FIG. 11 shows an exemplary diagram indicating that the width of the residue surface is one-half of the width and one-half of the height of the original progressive frame.

FIG. 3 shows an exemplary procedure 300 for accelerated video encoding, according to one embodiment. For purposes of exemplary description, the operations of the procedure are described with respect to components of system 100 of FIG. 1. The leftmost numeral of a component reference number indicates the particular figure where the component is first described.

At block 302, video encoder 116 (FIG. 1) receives input video data 122. If the input video data 122 is not compressed, the input video data represents decoded source video data. At block 304, if the input video data 122 is compressed, video encoder 116 decompresses the input video data to generate decoded source video data. At block 306, video encoder 116 interfaces with VA API 128 to query acceleration hardware 130 for capabilities and video encoding pipeline configuration implementation specifics. At block 308, video encoder 116 evaluates the supported capabilities and implementation specifics within the context of the implementation of the video encoder 116, to identify video encoding operations associated with the particular implementation of the video encoder 116 that may benefit from hardware acceleration, make encoding speed and/or quality decisions, minimize data transitions across busses and between processors, and/or so on.

At block 310, video encoder 116 creates an encoding object that implements an encoding pipeline configured to execute the identified video encoding operations that may benefit from hardware acceleration in acceleration hardware 130, implement the speed/quality tradeoffs (e.g., via a selected search profile), and minimize data flow transitions. At block 312, video encoder uses the created encoder object to encode the decoded source video data according to the sequence of operations and encoding architecture delineated by the customized video encoding pipeline generated at block 310. These encoding operations of block 312 generate encoded video data 126 (FIG. 1).

CONCLUSION

Although the systems and methods for accelerated video encoding have been described in language specific to structural features and/or methodological operations or actions, it is understood that the implementations defined in the appended claims are not necessarily limited to the specific features or actions described.

For example, although API's 128 of FIG. 1 have been described within the context of encoding video data, APIs 128 can be used outside of the encoding context for hardware acceleration of other functions such as edge detection, motion-vector based noise reduction, image stabilization, sharpening, frame rate conversion, velocity computation for computer vision applications, etc. For instance with respect to noise reduction, in one implementation video encoder 116 (FIG. 1) computes motion vectors for all macroblocks of decoded source image data. Then, video encoder 116 utilizes motion magnitude, direction, and correlation to motion vectors of surrounding macroblocks to determine whether there is a local object motion in the input image. In this implementation, the video encoder 116 of then utilizes the magnitude of the vector to direct object tracking/filtering aggressiveness or average shifts of a particular object to reduce statically random noise.

In another example with respect to image stabilization, in one implementation video encoder 116 computes motion vectors for all macroblocks and decoded source data. Video encoder 116 then determines whether there is global motion in the image. This is accomplished by correlating all motion vector values and determining whether the correlated values are similar. If so, then video encoder 116 concludes that there is global motion. Alternatively the video encoder 116 utilizes a large macroblock size and determines if there is overall motion of the large macroblock. After determining whether global motion is present, if video encoder 116 also finds that the global motion vector tends to be jerky across frames, video encoder 116 concludes that there is camera jerkiness and compensates for this before starting noise filtering and encoding operations.

Accordingly, the specific features and operations of system 100 are disclosed as exemplary forms of implementing the claimed subject matter.

The invention claimed is:

1. A method at least partially implemented by one or more processors of a computing device, the method comprising:
    receiving, by a video encoding acceleration service implemented by the one or more processors of the computing device, one or more queries from a video encoder to identify implementation specifics of acceleration hardware;
    responsive to receiving the one or more queries, the video encoding acceleration service:
        interfacing with the acceleration hardware to obtain the implementation specifics;
        responsive to receiving the implementation specifics, communicating the implementation specifics to the video encoder; and
        wherein the implementation specifics enable the video encoder during runtime to:
            determine whether one or more of speed and quality of software encoding operations associated with the video encoder can be increased with implementation of a particular encoding pipeline of one or more supported encoding pipeline configurations and capabilities; and
            implement the particular encoding pipeline by interfacing with the video encoding acceleration service;
    receiving, by the video encoding acceleration service, a request including a set of configuration parameters to create an encoder object that implements the particular encoding pipeline; and
    responsive to receiving the request, creating the encoder object based on the configuration parameters, the encoder object for encoding decoded source video data using the particular encoding pipeline.

2. The method claim 1, wherein the software encoding operations comprise one or more of motion estimation, residue computation, motion compensation, and transform operations.

3. The method claim 1, wherein the software encoding operations comprise one or more of noise reduction, image stabilization, edge detection, sharpening, and frame rate conversion operations.

4. The method claim 1, wherein the one or more queries comprise a get capabilities query, and wherein received implementation specifics include information associated with the one or more supported encoding pipeline configurations.

5. The method claim 1, wherein the one or more queries comprise a get distance metrics query, and wherein received implementation specifics include a description of one or more search metrics supported by the video encoding acceleration hardware for motion estimation operations.

6. The method claim 1, wherein the one or more queries comprise a get search profiles query, and wherein received implementation specifics include a description of one or more search profiles supported by the video encoding acceleration hardware, the one or more search profiles allowing the video encoder to evaluate implementation specific trade-offs between video encoding processing times and video encoding quality metrics.

7. The method claim 1, wherein the one or more queries comprise a get motion estimation capabilities query, and wherein received implementation specifics include data indicating one or more of maximum supported image size, maximum supported search window size, and an indication of whether acceleration hardware supports variable macro block sizes.

8. The method claim 1, wherein the configuration parameters specify one or more of the particular encoding pipeline, an output format for encoded video, a number of I/O data streams for association with the particular encoding pipeline, static configuration properties for interpolation of luma and chroma values, a suggested number of data buffers for the I/O data streams, and a device driver specified queue size based on available resources.

9. The method claim 1, further comprising:
receiving, by the video encoding acceleration service, execute requests and a set of parameters from the video encoder, the execute requests corresponding to operations associated with the particular encoding pipeline to encode decoded source video data;
responsive to receiving the execute requests, the video encoding acceleration service:
communicating the execute requests and the parameters to the acceleration hardware;
receiving responses associated with the communicated execute requests from the acceleration hardware; and
forwarding the responses to the video encoder.

10. A method comprising:
communicating, by a video encoder program module implemented by one or more processors configured with executable instructions, one or more requests to a video encoding acceleration service to identify capabilities of one or more of video encoding pipeline configurations and capabilities supported by acceleration hardware; and
responsive to receiving the capabilities from the video encoding acceleration service, the video encoder:
identifying, based on the capabilities, one or more video encoding operations associated with the video encoder that will benefit from one or more of speed and quality if implemented by the acceleration hardware;
requesting, by the video encoder, the video encoding acceleration service to create a customized video encoding pipeline for implementing the one or more video encoding operations via the acceleration hardware such that any remaining video encoding operations are implemented in software; and
directing the video encoding acceleration service to create the customized video encoding pipeline such that data flow between system memory and graphics device memory is minimized.

11. The method of claim 10, wherein the one or more video encoding operations comprise one or more of motion estimation, residue computation, motion compensation, and transform operations.

12. The method of claim 10, wherein the one or more video encoding operations comprise one or more of noise reduction, image stabilization, edge detection, sharpening, and frame rate conversion operations.

13. The method of claim 10, further comprising:
receiving, by the video encoder, encoded or decoded source video data; and
if received source video data is encoded, at least partially decoding, by the video encoder, the source video data to generate decoded source video data for encoding by an encoding object created by the video encoding acceleration service, the encoding object implementing the customized video encoding pipeline.

14. The method of claim 10, further comprising encoding decoded source video data using the customized video encoding pipeline.

15. A computing device comprising:
a processor coupled to a memory; and
a module maintained in the memory and executed on the processor for implementing a video encoding acceleration service to:
receive one or more queries from a video encoder, the one or more queries requesting the video encoding acceleration service to identify implementation specifics of acceleration hardware, the implementation specifics for enabling the video encoder to:
determine whether one or more of speed and quality of software encoding operations associated with the video encoder can be increased with implementation of a particular encoding pipeline of one or more supported encoding pipeline configurations and capabilities, and
implement the particular encoding pipeline via the video encoding acceleration service to encode decoded source video data;
query the acceleration hardware to obtain the implementation specifics;
communicate implementation specifics received from the acceleration hardware to the video encoder;
receive a create encoder object request from the video encoder to create an encoder object that implements the particular encoding pipeline;
receive one or more execute requests from the video encoder to implement operations associated with the particular encoding pipeline in the acceleration hardware; and
forward information associated with the one or more execute requests to the acceleration hardware to encode the decoded source video data.

16. The computing device of claim 15, wherein the software encoding operations comprise one or more of motion estimation, residue computation, motion compensation, and transform operations.

17. The computing device of claim 15, wherein the software encoding operations comprise one or more of noise reduction, image stabilization, edge detection, sharpening, and frame rate conversion operations.

* * * * *